UNITED STATES PATENT OFFICE.

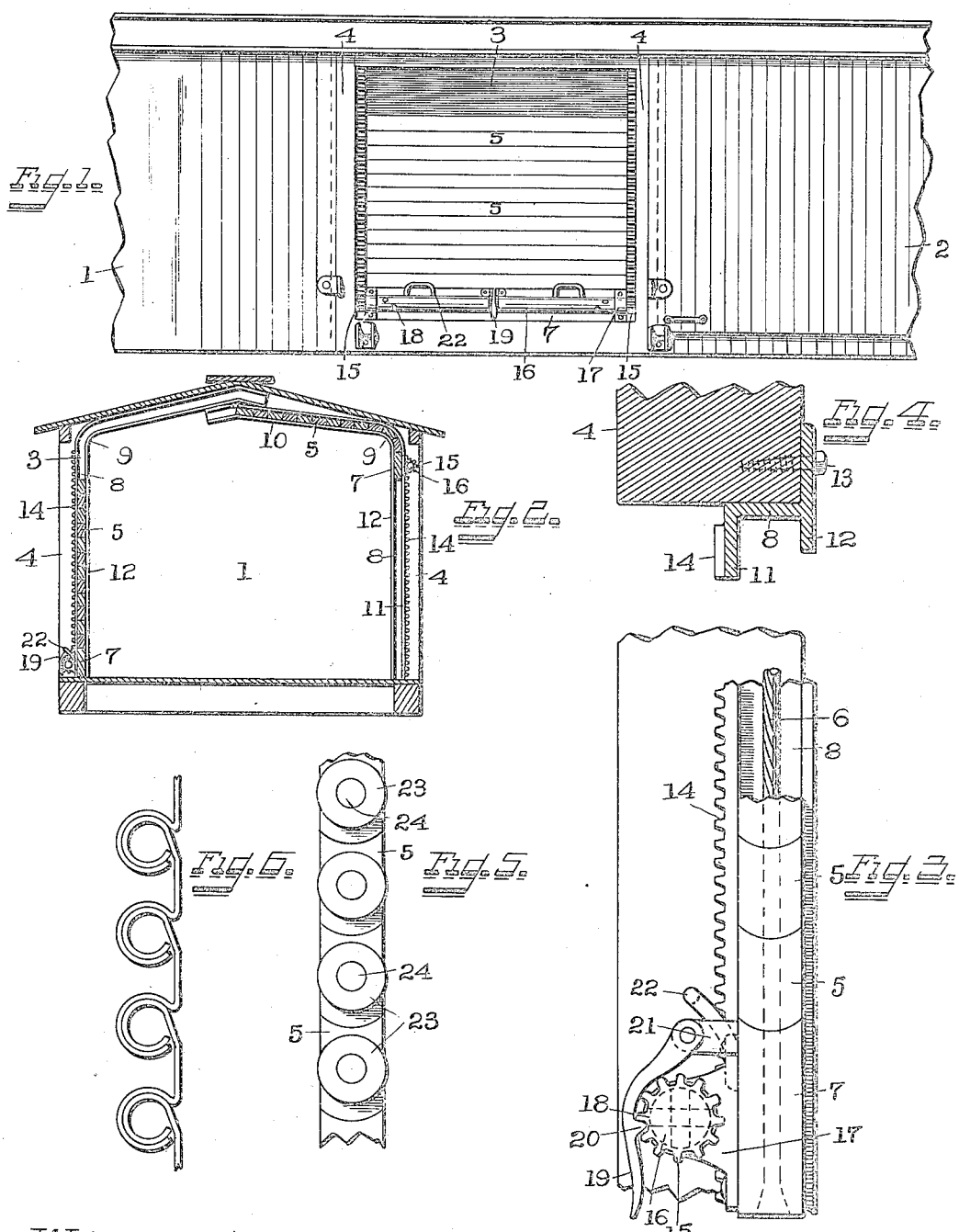

JOHN WIEMER, OF SAN JOSE, ILLINOIS.

GRAIN-CAR DOOR.

1,203,948.   Specification of Letters Patent.   Patented Nov. 7, 1916.

Application filed March 17, 1915. Serial No. 14,899.

*To all whom it may concern:*

Be it known that I, JOHN WIEMER, a citizen of the United States, residing at San Jose, in the county of Mason and State of Illinois, have invented certain new and useful Improvements in Grain-Car Doors, of which the following is a full, clear, and exact description, reference being had to the accompanying drawings, forming part of this specification.

My invention relates primarily to doors for grain cars, wherein it is desired to so close the door opening that the grain in the car can not leak out and be lost in transit, and wherein, when the car has reached its destination, the cargo may be discharged with the least possible waste of time and without injury to the door, and further whereby the door opening may be quickly closed grain tight for reloading, either at the point of discharge of the former cargo or at some later time or other place.

The object of my invention is to provide a door that will accomplish the above, the door to be easily applied to the car, easily operated when the car is loaded, cheap to produce and efficient in action.

Referring to the accompanying drawings, Figure 1 is a side elevation of part of a car showing my grain door in its closed position and showing the space between the top edge of the door and the door opening for filling the car with grain. Fig. 2 is a transverse section of a car showing one door closed and the other one opened. Fig. 3 is an enlarged detail, partly broken away, showing the grain door runway, the elevating and locking mechanism, a part of the door and a part of the door-post. Fig. 4 is a sectional plan view of a part of the door-post and the door runway. Fig. 5 is a broken end elevation of a modification in the construction of the slats of the door, showing the application of anti-friction devices, and Fig. 6 is a corresponding view of a further modification, showing a sheet metal construction.

The same numerals of reference are used to indicate identical parts in all the figures.

Referring to the drawings, 1 represents any ordinary car body having the usual sliding door 2 adapted to cover the opening 3 of the car body. As is usual, on each side of the door opening and extending from the floor to the roof, are the door posts 4.

The grain door structure consists of a plurality of slats or narrow sections 5 suitably secured together as by the cable 6 and attached to the lower section 7. Runways 8 are secured to the door posts 4 so as to form guides for the door structure, and these runways are extended to the top, or near the top of the door posts and are then bent toward the inside of the car as at 9 and are then extended along the under side of the roof of the car a sufficient distance to accommodate the length of the door structure when it is raised, as shown at 10. These runways are formed with a retaining groove formed by the flanges 11 and 12, the flange 12 being extended to afford a convenient means of attachment to the framing of the car and may be so attached by means of the lag screws 13. The outside face of the runway 8 is provided with rack teeth 14 which are adapted to be engaged by the pinion 15 as shown more clearly in Fig. 3, there being one of these pinions at each side of the door as shown in Fig. 1. The pinions 15 are mounted on opposite ends of a shaft or roller 16 which is suitably journaled on, and carried by, the lower section 7, as by journals 17, and said shaft or roller 16 is provided with openings or holes 18, said holes being arranged to receive the end of a bar for turning said shaft somewhat after the manner of operating a capstain. A latch mechanism consisting of the latch bar 19 with detent 20 is mounted in proximity to one of the pinions 15, by means of bracket 21 which is suitably secured to section 7. This latch mechanism may, as stated above, be mounted near one of the pinions 15 or a similar pinion or ratchet may be mounted at or near the middle of the shaft 16 and the latch mechanism be mounted adjacent thereto. Suitable handles 22, mounted on section 7, are provided for raising or lowering the door structure when the car is empty.

The modification shown in Fig. 5 consists of the mounting of antifriction rollers 23 on suitable trunnions 24 extending outwardly from the ends of all the sections of the door structure, and these rollers are slightly larger in diameter than the thickness of the door structure so that the rollers come in contact with the runways and reduce the amount of energy required to operate the door. These rollers are shorter in length than the depth of the groove in the runways so that no grain can pass out between the door structure and the runways.

The modification shown in Fig. 6 consists in forming the sections of sheet metal with telescoping top and bottom edges formed integral, in this way making a structure that is flexible to a sufficient degree, and light in weight and cheap to produce.

This structure is mounted with its smooth surface next the grain in the car, so as to reduce the friction of the grain to the minimum and permit easy operation.

The length of the door structure is less than the height of the door opening of the car so that when the door structure is closed or lowered, a space is left above the top to permit the grain to be introduced into the car as shown in Fig. 1, and the left side of Fig. 2. The top and bottom edges of the slats 5 are preferably formed as shown so as to afford flexibility of the structure without increasing its length.

Assume that the car is loaded with grain and has reached its destination and it is desired to unload the grain from the car. The operator, after having opened the sliding door, uses any handy bar such as a small crow-bar, and inserting it in one of the holes in the shaft 16, raises the free end of the bar and thereby partially rotates said shaft, whereupon the latch mechanism engages the pinion and retains the door in its raised position. The operator proceeds as above, namely inserting the bar and partially rotating the shaft until he has raised the door a sufficient distance to permit the grain to flow freely from the car. After a sufficient amount of grain has been run out to entirely release the door, the operator grasps the handles 22 and raises the door to its full extent and can then enter the car to unload whatever grain may remain in the car, as will be readily understood. To close the door, the operator again grasps the handles and turns the latch out of engagement with the pinion and lowers the door to the floor of the car.

It will be observed that the latch mechanism acts automatically in raising the door and will hold the same in any position it may be desired to leave it. It will be further observed that the rack and pinion movement for elevating the door affords an exceedingly powerful means of raising the door against the weight and friction of a load of grain in the car.

Instead of placing the cable 6 in the center of the slats as shown in Fig. 3, it may be placed near the rear, or inside, face of the slats and the edges of said slats may be formed straight as shown in Fig. 2.

If it is desired to seal the grain door, any suitable bracket may be provided near the free end of the latch lever and a suitable seal may then be attached; this bracket not being shown.

Having thus fully described my invention, I claim:

A grain car door adapted to rest on the floor of the car, said door comprising slats or sections, means for holding the slats or sections together, runways for the slats or sections extending up against the under side of the roof, a shaft mounted on the outside of the slats or sections, pinions on the shaft, and stationary racks on the outside of the car door posts where the contents of the car will not clog the same and with which the pinions mesh.

JOHN WIEMER.

Witnesses
   L. E. RABE,
   H. O. EGOLF.